Oct. 23, 1934.    W. E. SYKES    1,978,064
ATTACHMENT FOR CUTTING INTERNAL GEARS
Filed Sept. 22, 1931    3 Sheets-Sheet 1
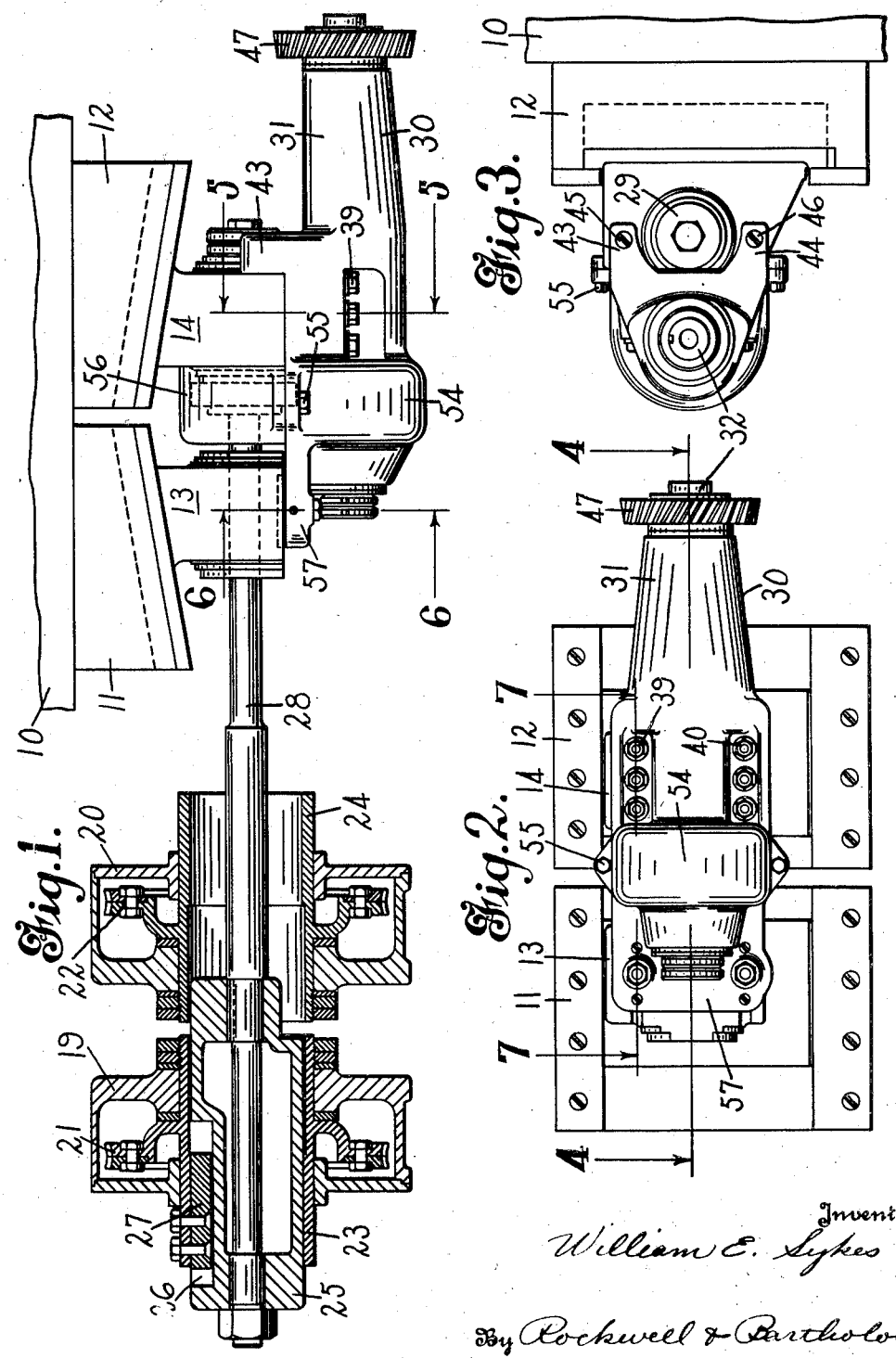
Inventor
William E. Sykes
By Rockwell & Bartholow
Attorneys

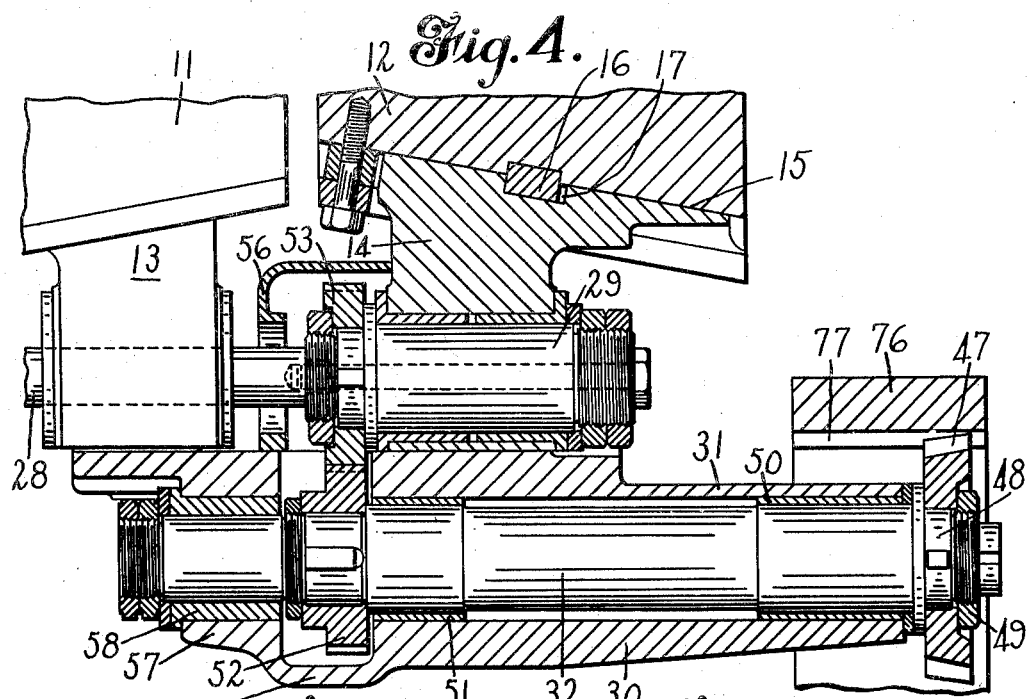

Oct. 23, 1934.   W. E. SYKES   1,978,064
ATTACHMENT FOR CUTTING INTERNAL GEARS
Filed Sept. 22, 1931   3 Sheets-Sheet 3
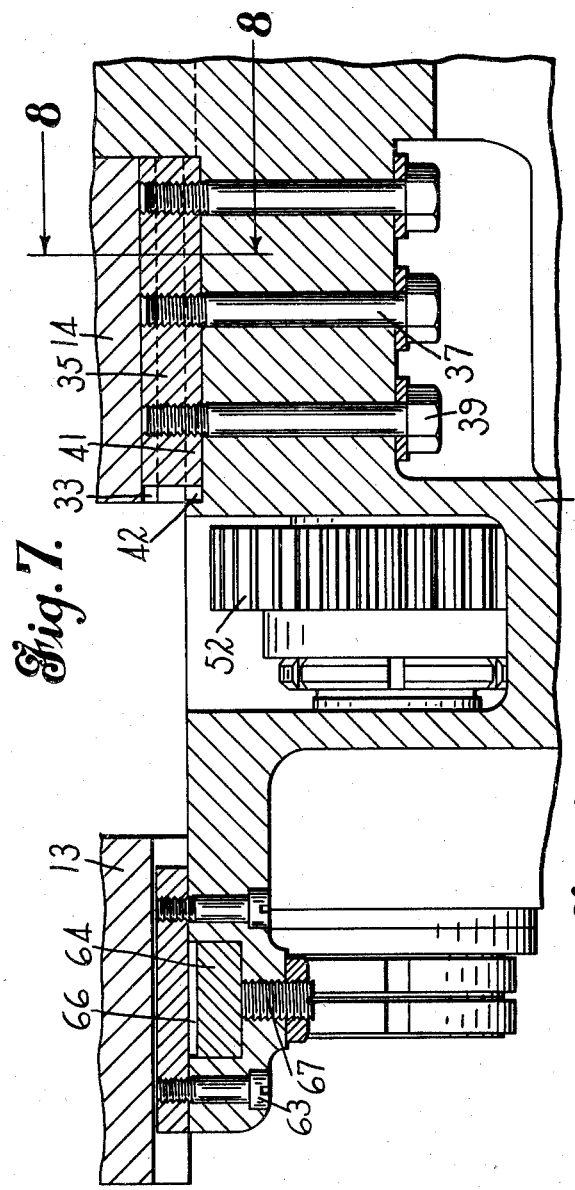
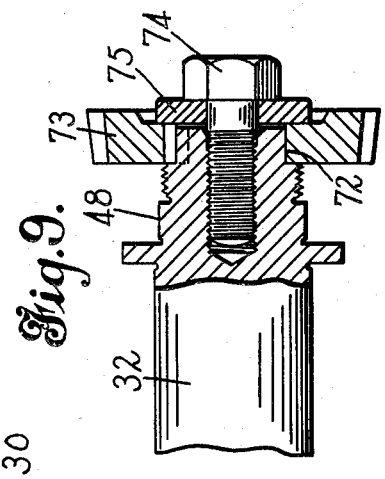
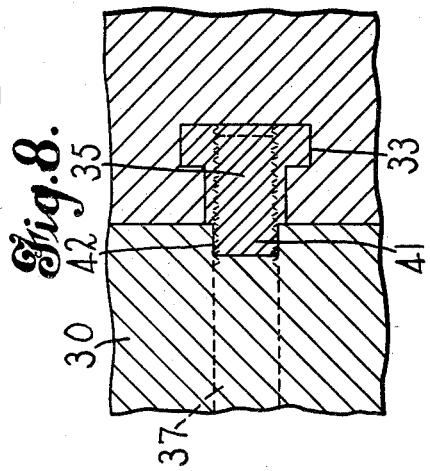
Inventor
William E. Sykes
By Rockwell & Bartholow
Attorneys Patented Oct. 23, 1934

1,978,064

UNITED STATES PATENT OFFICE 1,978,064

ATTACHMENT FOR CUTTING INTERNAL GEARS

William E. Sykes, Buffalo, N. Y.

Application September 22, 1931, Serial No. 564,361

15 Claims. (Cl. 90—9)

This invention relates to a machine for cutting gear teeth and more particularly to a machine for forming the teeth of internal gears by a generating action. While the improvements herein described will be found advantageous in cutting internal gears having straight teeth, the invention, as will appear, is also applicable to the cutting of internal gears having helical teeth and is adapted to be used in connection with a machine wherein a cutter is reciprocated across the gear blank while at the same time the blank and cutter are given rotating feeding or generating movements to cause the cutter to traverse the surface or inner periphery of the blank. If helical teeth are being cut, the cutter will at the same time be given a helical or twisting movement, and in any case it is desirable to provide for a relief movement of the cutter to withdraw it from the work during its inoperative stroke.

One object of the present invention is the provision of an improved machine for generating the teeth of internal gears.

A further object of the invention is the provision of an improved machine for the continuous generation of internal gear teeth wherein the blank and cutter are given a continuous rotative feeding movement and provision is made for permitting the withdrawal of the cutter from the blank during its inoperative stroke.

Still another object of the invention is the provision of an improved machine for generating the teeth of internal gears by the movement of a reciprocating planing cutter moved across the inner periphery of the gear blank.

A still further object of the invention is the provision of an attachment for cutting the teeth of internal gears, which attachment may be mounted upon a machine for cutting the teeth of external gears, whereby such a machine may be readily and easily converted into one for cutting the teeth of internal gears.

To these and other ends the invention consists in the novel features and combinations of parts to be hereinafter described and claimed.

In the drawings:

Fig. 1 is a top plan view of a portion of a gear cutting machine embodying my invention;

Fig. 2 is a front elevational view of the cutter mechanism shown at the right of Fig. 1;

Fig. 3 is an end elevational view of the part shown in Fig. 2;

Fig. 4 is a sectional view on line 4—4 of Fig. 2;

Fig. 5 is a sectional view on line 5—5 of Fig. 1;

Fig. 6 is a sectional view on line 6—6 of Fig. 1;

Fig. 7 is a sectional view on line 7—7 of Fig. 2;

Fig. 8 is a sectional view on line 8—8 of Fig. 7; and

Fig. 9 is a detail view partly in section of the end of the cutter shaft.

I have chosen to illustrate and describe my improvements in connection with a machine for cutting external gears, such, for instance, as that shown in my Patent No. 1,814,348, granted July 14, 1931. It will be understood, however, that the improvements are not limited to a machine of this particular construction, but may be used in connection with other gear cutting machines as well. The machine shown in that patent is designed particularly for cutting the teeth of external gears either of the spur gear type or those having single or double helical teeth. The machine shown in the patent, as will be obvious from reference thereto, shows a pair of cutters designed to be reciprocated across the face of a gear blank in a planing motion, and adapted to have separate relief movements whereby each cutter will be relieved or enabled to clear the blank during its inoperative stroke. Beside these movements, the cutters and blank are given continuous generating or feeding movements whereby the cutters will traverse the entire surface of the blank, and if helical gear teeth are being cut, the cutters will be given a twisting or helical movement during the cutting operation.

As my present improvements are embodied in an attachment to a machine of this character, I have shown in this application only the portions of the machine shown in my prior patent which are contiguous to the novel features described and claimed herein.

As shown in Fig. 1 of the drawings, the machine comprises a slide or carrier 10, to which are secured sub-supports 11 and 12 to which are in turn secured the cutter carriers or supports 13 and 14. As shown in Fig. 4, the abutting surfaces of the cutter supports and sub-supports are inclined as at 15, and the cutter support is permitted a limited sliding movement with relation to the sub-support along this surface, the movement being limited by a bar 16 secured to the sub-support and cooperating with or resting in a groove 17 in the cutter support, the groove being slightly larger than the width of the bar.

Within housings 19 and 20 are rotatably mounted worm wheels 21 and 22, which are secured to hollow hubs 23 and 24, and within one of these hubs, the hub 23 as shown herein, is mounted a guide sleeve 25 having a groove 26 within which is disposed a nut 27 secured to the hub 23.

Secured to the guide sleeve 25 is a spindle or shaft 28 which passes through the cutter support 13 and is secured at its other end to a hollow shaft or sleeve 29 rotatably mounted within the cutter support 14.

The above parts are more particularly described in my prior patent, above referred to, and in addition there are shown in that patent a guide and guide block within the hollow hub 24 similar to the guide 25 and guide block 27 shown in this application. As shown in the said patent, the second guide is secured to a sleeve or collar rotatably mounted within the cutter support 13, but as in the present application one cutter only is used, these parts are omitted in the present embodiment of my invention.

As clearly described in said patent, the carriage 10 is given a reciprocating movement to reciprocate the cutter supports (and the cutters carried thereby) relatively to the gear blank. The guide sleeve 25 is thus drawn through the hub 23, and at the same time is given a rotating movement (when the hub 23 is rotated by the worm wheel 21) by the engagement of the guide block 27 within the groove 26. If the groove 26 and nut 27 have helical engaging surfaces, the guide sleeve 25, and therefore the spindle 28, will also be given a helical movement.

As has already been stated, the elements heretofore described have been applied to a machine for cutting external gears. I will now describe my improvements which adapt such a machine to the cutting of the teeth of internal gears.

To the cutter support 14 is secured a bracket 30, this bracket being provided with an extension or snout 31 and with a shaft opening extending through the bracket and snout in which is mounted a shaft 32, which may be termed the cutter shaft. The cutter support 14 may be provided with grooves 33 and 34 in which are mounted T-shaped plates 35 and 36, these plates being provided with threaded openings to receive bolts 37 and 38. These bolts extend through the bracket 30 to receive nuts 39 and 40 so as to securely clamp the bracket to the cutter support.

As shown in Fig. 7, the plate 35 may be extended in a forward direction as shown at 41 to project into a groove 42 within the bracket so that the latter will be held in proper position to hold the cutter shaft 32 in line with the spindle 28. The bracket 30 may also be provided with lugs 43 and 44, shown more especially in Fig. 3, which abut the end surface of the cutter support 14 and are secured thereto by screws 45 and 46.

As shown more especially in Fig. 4, the shaft 32 projects from the bracket 30 and upon its projecting end is secured the cutting tool 47 which rests upon a seat 48 on the end of the shaft and is held in place by the nut 49 threaded upon the shaft. The bracket 30 is provided with suitable shaft bushings 50 and 51 and upon the shaft 32 adjacent the end opposite that upon which the cutter is mounted is secured a gear 52 which meshes with a gear 53 secured upon the sleeve 29, which, as will be recalled, is in turn secured to the spindle 28. The bracket 30 is provided with an enlarged portion 54 to house the gear 52, and at the back thereof may be secured by means of bolts 55 a gear cover or guard 56, which embraces the gear 53.

It may be found desirable to provide a support for the bracket 30 upon the other cutter support 13, and to this end this bracket is provided with an extension 57 which is provided with a bearing 58 for the end of the shaft 32, and means are provided, as will now be described, for permitting this bracket extension 57 to bear against the outer surface of the cutter support 13, particularly during the operative stroke of the cutter.

The cutter support is provided in its face adjacent the extension 57 with upper and lower grooves 59 and 60, and upon the rear face of the extension 57 are secured plates 61 and 62 designed to rest in these grooves, these plates being secured to the cutter by means of screws 63. The plates 61 and 62 are not intended to ride in the bottom of the grooves, but serve to position the bracket extension 57 in a vertical direction. Mounted in recesses in the bracket extension 57 are bearing disks or wear disks 64 and 65 which are provided with grooves 66 to embrace the plates 61 and 62 so that the rear surfaces of these bearing members may bear against the outer surface of the cutter support 13 and thus support the bracket extension 57 against movement toward the sub-support 11. These bearing members may be adjusted by means of screws 67 and 68 to and from the support 13 and are held in adjusted position by means of the set screws 69 and 70.

As shown in Fig. 9, the outer end of the shaft 32 is stepped, and in addition to the cutter seat 48 is provided with a second cutter seat 72 upon which may be mounted a cutter 73 having a bore different from the cutter 47 shown in Fig. 4 upon the cutter seat 48. The cutter 73 may be secured in place by means of the bolt 74 and washer 75.

The operation of the machine will be apparent from the foregoing description, but may be briefly described as follows. In Fig. 4 of the drawings a portion of a gear blank is shown at 76, the teeth 77 of which are being cut by the cutter 47. It will be understood that the reciprocation of the carriage 10, as set forth more particularly in my prior Patent No. 1,814,348, carries the cutter across the surface of the blank in a reciprocating movement. The operative stroke of the cutter will be that toward the right, as shown in Figs. 1 and 4, which is, as will be understood, opposite to that of the action of the external gear cutting machine shown in the patent heretofore referred to.

This movement of the parts toward the right will tend to move the cutter support 14 toward the left from the position shown in Fig. 4. Due to the sliding of the cutter support on the inclined surface 15, the cutter shaft 32 and cutter thereon will be drawn toward the blank so as to engage the latter during the cutting stroke. When the cutter has reached the limit of its operative stroke, the carriage 10 will be moved toward the left. This movement of the sub-support 12 will cause the cutter support 14 to move up the incline 15 to the position shown in Fig. 4 and will effect a slight relief movement of the cutter causing it to move away from the blank, as shown in this figure.

In most instances the inertia of the cutter support 14 and the parts carried thereby will be sufficient to effect its relief movements along the inclined surface 15. If necessary, however, I can provide positive relief movements for the cutter, as shown in my Patents Nos. 1,814,348, and 1,750,030, granted March 11, 1930.

It will also be understood that during the reciprocating movements of the cutter the latter will be given a rotating generating movement due to the rotation of the hub 23 by the worm 21. As has already been described, the rotation of the hub 23 through the engagement of the nut 27 in the groove 26 effects the rotation of the shaft 28 and the collar or sleeve 29 secured on this shaft. As the gear 53 is secured upon the sleeve 29 and engages the gear 52 secured upon the cutter shaft 32, the latter will be rotated synchronously with the worm wheel 21 so as to give the proper generating feeding movement to the cutter 47. Through the same chain of mechanism the cutter will be given a helical twisting movement during its reciprocating movement if the nut 27 and groove 26 have cooperating helical guide surfaces.

It will be understood that the cutter support 13 is given a relief movement opposite to that of the cutter support 14, that is, as shown in Fig. 1, when the cutter support 13 moves away from the carriage 10, the support 14 will move toward this carriage, which movement will occur during the operative stroke of the internal gear cutter. Therefore, during the operative stroke of the cutter the support 13 will be in its outward position and will rest against the extension 57 of the bracket 30 so as to give support to the end of the latter opposite the cutter. During the inoperative stroke the cutter support 13 may assume its inner position and move out of engagement with the bracket extension 57, but at this time no support will be necessary for this end of the bracket and shaft 32.

While I have shown and described a preferred embodiment of my invention, it will be understood that it is not to be limited to all the details shown but is capable of modification and variation within the spirit of the invention and the scope of the appended claims.

What I claim is:

1. Means for cutting internal gears comprising a reciprocating carrier, a pair of spaced supports mounted thereon, a shaft journaled in one of said supports and having a gear thereon between the supports, a bracket detachably secured to one of said supports and extending beyond the same at both sides thereof, one of the extended ends of said bracket bearing against the other support, and a shaft mounted in said bracket and driven from said gear, said shaft extending from the other end of the bracket and having a cutter thereon.

2. Means for generating internal gears comprising a reciprocating carrier, a pair of cutter supports thereon, a shaft journaled in one of said supports, a bracket detachably secured to one of said supports and having a portion resting against the other thereof, a second shaft mounted in said bracket and having a cutter mounted on an extending end thereof, and a driving connection between said shafts.

3. Means for converting into an internal gear cutter an external gear cutting machine, having a reciprocable cutter support and a cutter shaft journaled therein, said means comprising a member securable to said support and having an auxiliary shaft journaled therein, a cutter carried by the auxiliary shaft, and means for drivingly connecting the auxiliary shaft to the first named shaft, said shafts extending parallel to the direction of the reciprocable movement of the cutter support.

4. Means for converting into an internal gear cutter an external gear cutting machine, having a reciprocable cutter support and a cutter shaft journaled therein, said means comprising a bracket rigidly securable to said support and having an auxiliary shaft journaled therein and geared to the first named shaft, and a cutter carried by the auxiliary shaft, and said shafts being moved by said cutter support longitudinally of their axes.

5. Means for converting into an internal gear cutter an external gear cutting machine, having a reciprocable cutter support and a cutter shaft journaled therein and moved by the support in the direction of its length, and a gear on said shaft at one side of the support, said means comprising a bracket detachably secured to said support and having a bearing portion extending beyond the support on the side opposite said gear, an auxiliary shaft in said bearing, driven from said gear and projecting through the extended end of the bearing, and a cutter on the projecting end of the shaft.

6. Means for converting into an internal gear cutter an external gear cutting machine, having a reciprocable cutter support and a cutter shaft journaled therein and connected thereto for longitudinal movement thereby, said means comprising a bracket rigidly and detachably secured to said support and having a bearing portion extending beyond the support, an auxiliary shaft rotatably mounted in the bearing and geared to the first named shaft, and a cutter on the auxiliary shaft beyond the extended end of the bearing portion of the bracket.

7. Means for converting into an internal gear cutter an external gear cutting machine, having a reciprocable cutter support and a cutter shaft journaled therein, said means comprising a bracket rigidly and detachably secured to said support and having a bearing portion extending beyond the support, an auxiliary shaft rotatably mounted in the bearing and geared to the first named shaft, and a cutter on the auxiliary shaft beyond the extended end of the bearing portion of the bracket, and said bracket having means abutting the side of the support adjacent the cutter to resist thrust thereupon.

8. Means for converting into an internal gear cutter an external gear cutting machine, having a reciprocating cutter carrier, a cutter support carried on inclined guideways on said carrier, a shaft journaled therein, and means permitting movement of said support in a direction transverse to the axis of the shaft, said first named means comprising a bracket rigidly secured to the support, a second shaft carried by the bracket and geared to the first shaft, and a cutter carried by the second shaft, said bracket and shaft therein moving with said support in its movement on said guideways to relieve the cutter from the work.

9. Means for converting into an internal gear cutter an external gear cutting machine, having a reciprocable cutter support, a shaft journaled therein, and means permitting movement of said support in a direction transverse to the axis of the shaft, said first named means comprising a bracket rigidly secured to the support, a second shaft carried by the bracket, parallel to and geared to the first shaft, and a cutter carried by the second shaft, said bracket and shaft therein moving with said support to relieve the cutter from the work, and said movement taking place in a direction at right angles of the axes of said shafts.

10. Means for converting into an internal gear cutter an external gear cutting machine, having a reciprocable cutter support, a shaft journaled therein, and means permitting movement of said support in a direction transverse to the axis of the shaft, said first named means comprising a bracket rigidly secured to the support, a second shaft carried by the bracket and geared to the first shaft, and a cutter carried by the second shaft, said bracket and shaft therein moving with said support to relieve the cutter from the work, said movement taking place in a direction away from said support, and said bracket having an extended end projecting beyond the cutter support at one side thereof and provided with projecting lugs abutting the side of the support.

11. An attachment for gear cutting machines, having a reciprocating carrier, a cutter support carried thereby at one side thereof, and a shaft journaled in said support, said attachment comprising a bracket adapted to be secured to the support on the side opposite said carrier, a cutter shaft journaled in the bracket and having a cutter thereon, an intermeshing gear connecting said first named shaft and said cutter shaft, said cutter shaft extending beyond the cutter support and having the cutter mounted on its extended end whereby it is adapted to cut internal gears.

12. An attachment for gear cutting machines, having a reciprocating cutter support, a shaft rotatably mounted in said support for movement thereby longitudinally of its axis, and a gear on the shaft at one side of the support, said attachment comprising a bracket secured to the support and having a bearing portion extending therebeyond on the side opposite the gear, a shaft extending through said bearing, and a cutter on the projecting end of the shaft, said last named shaft being parallel to the first and rotated from the gear on the first shaft.

13. Means for cutting internal or external gears comprising a reciprocating carrier, a shaft rotatably associated with said carrier and having its axis extending in the direction of reciprocation thereof, a housing detachably secured to the carrier, a second shaft rotatably mounted in the housing in parallel relation to the first shaft, a cutter on said second shaft, and intermeshing gears on said shafts whereby the second is driven from the first.

14. Means for cutting internal gears comprising a reciprocating carrier, a cutter support movably mounted upon said carrier, a pair of substantially parallel shafts rotatably associated with said support and extending in the direction of reciprocation of the carrier, intermeshing gears on said shafts, one of said shafts being extended beyond the other at one end and having a cutter journaled on said ends, and the movable mounting of said cutter support permitting said cutter to move toward the carrier during the operative stroke thereof to effect contact between the cutter and the work.

15. Means for cutting internal gears comprising a reciprocating carrier, a cutter support movably mounted upon said carrier, a pair of substantially parallel shafts rotatably associated with said support and extending in the direction of reciprocation of the carrier, intermeshing gears on said shafts, one of said shafts being extended beyond the other at one end and having a cutter journaled on said ends, and the movable mounting of said cutter support permitting the cutter to move toward the carrier during the operative stroke thereof, and away from the carrier during the inoperative stroke thereof, the latter movement relieving the carrier from the work.

WILLIAM E. SYKES.